(12) United States Patent
Yao et al.

(10) Patent No.: US 8,833,165 B2
(45) Date of Patent: Sep. 16, 2014

(54) MINIATURIZED PIEZOELECTRIC ACCELEROMETERS

(75) Inventors: Kui Yao, Singapore (SG); Saravanan Shanmugavel, Singapore (SG); Trung Dung Luong, Singapore (SG); Ajit S. Gaunekar, Singapore (SG); Hon Yu Peter Ng, Hong Kong (HK)

(73) Assignee: Agency for Science, Technology and Research, Singapore (SG)

( * ) Notice: Subject to any disclaimer, the term of this patent is extended or adjusted under 35 U.S.C. 154(b) by 558 days.

(21) Appl. No.: 13/202,091

(22) PCT Filed: Sep. 4, 2009

(86) PCT No.: PCT/SG2009/000315
§ 371 (c)(1),
(2), (4) Date: Aug. 17, 2011

(87) PCT Pub. No.: WO2010/096020
PCT Pub. Date: Aug. 26, 2010

(65) Prior Publication Data
US 2011/0296918 A1    Dec. 8, 2011

Related U.S. Application Data

(60) Provisional application No. 61/153,094, filed on Feb. 17, 2009.

(51) Int. Cl.
G01P 15/09    (2006.01)
G01P 15/18    (2013.01)
G01P 15/08    (2006.01)

(52) U.S. Cl.
CPC ............. *G01P 15/0922* (2013.01); *G01P 15/18* (2013.01); *G01P 15/0802* (2013.01)
USPC ......................................... 73/514.34; 216/13

(58) Field of Classification Search
CPC .................................................... G01P 15/0922
USPC ......... 73/510, 514.01, 514.16, 514.34; 216/13
See application file for complete search history.

(56) References Cited

U.S. PATENT DOCUMENTS 4,699,006 A * 10/1987 Boxenhorn ................. 73/514.15
4,922,756 A *  5/1990 Henrion ..................... 73/514.18
(Continued)

FOREIGN PATENT DOCUMENTS

| EP | 1 887 365 A2 | 2/2008 |
| JP | 10-054842 A | 2/1998 |
| JP | 2000-162235 A | 6/2000 |

OTHER PUBLICATIONS

PCT International Search Report for PCT Counterpart Application No. PCT/SG2009/000315 containing Communication relating to the Results of the International Search Report, 4 pgs., (Oct. 7, 2009).

(Continued)

*Primary Examiner* — Peter Macchiarolo
*Assistant Examiner* — Samir M Shah
(74) *Attorney, Agent, or Firm* — Blakely, Sokoloff, Taylor & Zafman LLP (57) ABSTRACT

The miniaturized piezoelectric accelerometer includes a support frame (102) having a cavity (104) and a seismic mass (108) supported by a plurality of suspension beams (110) extending from the support frame (102). Each of the suspension beams (110) has a piezoelectric thin film coated on a top surface thereof, with a pair of inter-digital electrodes (114) deposited on an upper surface of each piezoelectric thin film. The presence of acceleration excites bending and thus strain in the piezoelectric thin film, which in turn causes electrical signals to be generated over terminals of the electrodes (114). To collect constructively the output of the electrodes (114), one terminal of each of the electrodes (114) is routed to and electrically connected at a top surface (308) of the seismic mass (108).

20 Claims, 7 Drawing Sheets

(56) References Cited

U.S. PATENT DOCUMENTS

| | | | |
|---|---|---|---|
| 5,095,751 A * | 3/1992 | Wada et al. | 73/514.16 |
| 5,824,904 A * | 10/1998 | Kouhei et al. | 73/514.34 |
| 6,823,735 B2 * | 11/2004 | Ishikawa et al. | 73/514.02 |
| 7,093,489 B2 * | 8/2006 | Tanaka et al. | 73/514.32 |
| 7,249,510 B2 * | 7/2007 | Nakamura | 73/514.33 |
| 7,398,683 B2 * | 7/2008 | Lehtonen | 73/514.32 |
| 7,843,285 B2 * | 11/2010 | Kawamura | 333/187 |
| 7,956,302 B1 * | 6/2011 | Jean et al. | 200/61.45 R |
| 8,215,168 B2 * | 7/2012 | Merz et al. | 73/504.02 |
| 8,322,216 B2 * | 12/2012 | Yu et al. | 73/514.32 |
| 2004/0159166 A1 | 8/2004 | Schiller | |
| 2005/0172716 A1 * | 8/2005 | Tanaka et al. | 73/514.23 |
| 2009/0183570 A1 * | 7/2009 | Acar et al. | 73/514.32 |
| 2009/0320593 A1 * | 12/2009 | Nakashio et al. | 73/504.15 |

OTHER PUBLICATIONS

PCT Written Opinion of the International Searching Authority for PCT Counterpart Application No. PCT/SG2009/000315, 4 pgs., (Oct. 7, 2009).

Han Geun Yu, et al., "Lead Zirconate Titanate MEMS Accelerometer using Interdigitated Electrodes", Sensors and Actuators A: Physical, vol. 107, Issue 1, pp. 26-35, (Oct. 1, 2003).

* cited by examiner

MINIATURIZED PIEZOELECTRIC ACCELEROMETERS

CROSS-REFERENCE TO RELATED APPLICATIONS

This patent application is a U.S. National Phase application under 35 U.S.C. §37 of International Application No. PCT/SG2009/000315, filed Sep. 4, 2009, entitled MINIATURIZED PIEZOELECTRIC ACCELEROMETERS, which claims priority to U.S. patent application No. 61/153,094, filed Feb. 17, 2009.

FIELD OF THE INVENTION

The present invention relates to miniaturized piezoelectric accelerometers and methods of fabricating miniaturized piezoelectric accelerometers.

BACKGROUND OF THE INVENTION

Miniaturized piezoelectric accelerometers are in high demand for applications in aerospace, automobiles, military systems, and machine condition monitoring. Various acceleration sensing mechanisms have been used in accelerometers, including electrostatic, capacitive, piezoresistive, and piezoelectric. Compared to other accelerometers, piezoelectric accelerometers have significant advantages of quick response, high performance at high frequency, high output impedance, low power consumption, and the potential of being self-powered.

Micro electromechanical systems (MEMS) has been applied to produce miniaturized piezoelectric accelerometers using piezoelectric thin films, with the objectives of further miniaturization, improved production consistency, reduced unit cost and the capability of integrating multiple functions. However, the small thickness of piezoelectric thin films significantly restricts the magnitude of electrical voltage output from miniaturized piezoelectric MEMS accelerometers. Therefore, efforts have been made in the prior art to design and fabricate miniaturized piezoelectric MEMS accelerometers by aligning the electrical polarization with the surface plane of the piezoelectric thin films. In such an in-plane design, a pair of piezoelectric electrodes is deposited on the top of the piezoelectric thin films to replace the conventional sandwich electrode configuration. In such an arrangement: (i) the limitation of the small thickness on the electrical output voltage of the piezoelectric accelerometers is compensated and the voltage sensitivity is improved, (ii) the electrical output generated over the electrodes is determined by the longitudinal piezoelectric coefficient (commonly referred to as $d_{33}$), which is usually significantly larger than the transverse piezoelectric coefficient (commonly referred to as $d_{31}$) as utilized in the sandwich electrode configuration, and (iii) the relevant fabrication and packing process become simpler without the need to use and connect any bottom electrode.

Conventional piezoelectric MEMS design with inter-digital electrodes includes a micro cantilever structure and a diaphragm structure. Piezoelectric micro-cantilever structures, which comprise multiple thin layers including a piezoelectric ceramic thin film, often deform seriously due to large residual stress. They are very brittle and liable to break under a large mechanical shock. Piezoelectric diaphragm structures are much more robust but the structure is very rigid, particularly when the size of the diaphragm is further reduced, which in turn unfavourably limits the sensitivity at small sizes.

SUMMARY OF THE INVENTION

The present invention is defined in the appended independent claims. Some optional features of the present invention are defined in the appended dependent claims.

In general terms, the present invention relates to a miniaturized piezoelectric accelerometer having a plurality of pairs of inter-digital electrodes, with each pair having at least one terminal routed to and connected at a top surface of a seismic mass to collect constructively the output of the inter-digital electrodes.

In one specific expression, the present invention relates to a miniaturized piezoelectric accelerometer comprising: a support frame having a cavity therein, the cavity having a central longitudinal axis, a seismic mass in the cavity and having a central longitudinal axis, the central longitudinal axis of the cavity and the central longitudinal axis of the seismic mass being co-incident, a plurality of suspension beams extending from the support frame to the seismic mass, each of the suspension beams having a piezoelectric thin film coated on a top surface thereof, a pair of inter-digital electrodes deposited on an upper surface of each piezoelectric thin film, and at least one terminal of each of the inter-digital electrodes being routed to and electrically connected at a top surface of the seismic mass.

Preferably the cavity has a base and the seismic mass has a bottom, the bottom being spaced from the base. This is advantageous as it reduces the likelihood of the seismic mass contacting a surface on which the accelerometer is placed, thus minimizing any measurement inaccuracies resulting from such contact.

Preferably the piezoelectric thin film has an electric polarization that is approximately aligned with a plane of the top surface of the suspension beams to improve the sensitivity of the piezoelectric accelerometer.

Preferably the electrical connection of the at least one terminal of each of the inter-digital electrode is at the central longitudinal axis of the seismic mass. It is also preferable for the pairs of inter-digital electrodes to be electrically connected in parallel.

Preferably the inter-digital electrodes are disposed at a location selected from the group consisting of: adjacent the seismic mass and adjacent the support frame. The location may be chosen based on a desired application of the accelerometer since the location of the inter-digital electrodes affects the accelerometer's characteristics.

Preferably the cavity of the support frame has a regular polygon shape defined by polygon sides. The suspension beams advantageously extend orthogonally from a centre of each polygon side to reduce the local stress concentration at the joints of the suspension beams with the support frame. Preferably the suspension beams are substantially rectangular.

In one embodiment, the regular polygon shape is a square, and the plurality of suspension beams comprises four suspension beams. In another embodiment, the regular polygon shape is an octagon, and wherein the plurality of suspension beams comprises eight suspension beams. These are, of course, non-limiting embodiments since it will be appreciated that other shapes and differing numbers of suspension beams may be used where necessary or desired.

In one embodiment, the seismic mass is cylindrical. In another embodiment, the seismic mass has a regular polygon shape with polygon sides that are parallel with polygon sides of the cavity (e.g. an octagonal-prism seismic mass in an octagonal-shaped cavity).

Preferably the support frame, the suspension beams and the seismic mass are made of a monolithic substrate material. The suspension beams may comprise multiple layers, including Si, $SiO_2$, $SiN_x$, YSZ, and ferroelectric PLZT.

In another specific expression, the present invention relates to a method of fabricating miniaturized piezoelectric accelerometers comprising: depositing a piezoelectric thin film and an electrode layer on a front side of a wafer, patterning the electrode layer to produce inter-digital electrodes and electrical connections for the inter-digital electrodes, with at least one terminal of the inter-digital electrodes being routed to and electrically connected at a top surface of a part of the wafer that defines or that will define a seismic mass of the accelerometer, etching the piezoelectric thin film and the wafer from the front side to form a plurality of suspension beams extending from a support frame of the accelerometer, and etching from a back side of the wafer to form a cavity of the support frame and the seismic mass.

In one embodiment, the wafer is a single crystal silicon wafer and the step etching from the back side of the wafer is carried out to space a bottom of the seismic mass from a base of the cavity. A silicon wafer based fabrication process advantageously allows mass production of the miniaturized piezoelectric accelerometers with the thickness of the suspension beams determined by the front side etching process. In another embodiment, the wafer is a silicon-on-insulator (SOI) wafer comprising a thin Si layer, a $SiO_2$ layer, and a bulk Si layer, with the thickness of the suspension beams being determined by the thickness of the thin Si layer and the $SiO_2$ layer. SOI wafers advantageously allow precise control of the thickness and device specifications of the miniaturized accelerometers.

The method further advantageously includes etching to form dicing lines comprising forming trenches at the front side of the wafer around individual accelerometers with a depth corresponding to the desired thickness of the suspension beams, except at fixed locations, and forming corresponding trenches at the back side of the wafer until the trenches at the front side and the back side are connected, leaving the individual accelerometers joined to each other only at the fixed locations. As a further step, the method may include separating the individual accelerometers by applying a small force at the fixed locations, the fixed locations being near corners of the support frame of each accelerometer.

As will be apparent from the following description, preferred embodiments of the present invention provide accelerometers with highly miniaturized sizes with significantly improved structural robustness and flexibility, as well as enhanced sensitivity compared to existing accelerometers. Embodiments of the method of the present invention allow the production of accelerometers at reduced cost and at improved consistency and reliability. These and other related advantages will be readily apparent to skilled persons from the description below.

BRIEF DESCRIPTION OF THE FIGURES

Preferred embodiments of the present invention will now be described by way of example with reference to the accompanying figures in which.

DETAILED DESCRIPTION OF THE PREFERRED EMBODIMENTS

Figure 1A:
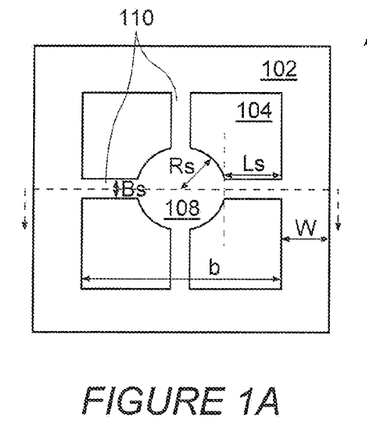
FIGS. 1A and 1B are schematics respectively showing a plan view and a cross-sectional view of one embodiment of the accelerometer having four suspension beams.
Figure 1B:
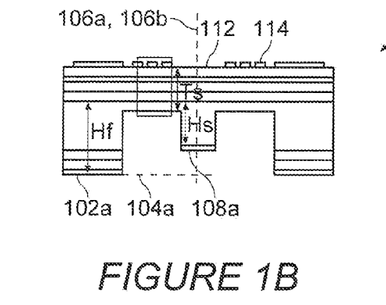
Figure 1C:
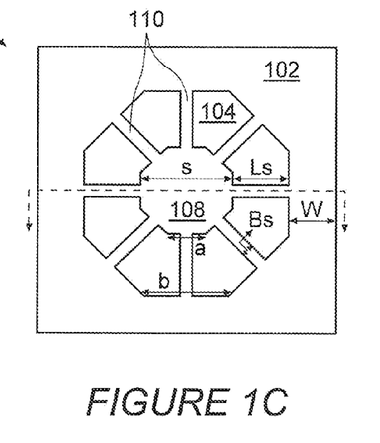
FIGS. 1C and 1D are schematics respectively showing a plan view and a cross-sectional view of another embodiment of the accelerometer having eight suspension beams.

Referring to FIGS. 1A to 1D, the general layout of two embodiments of the piezoelectric accelerometer 100 is shown. Both embodiments include a support frame 102 with a width W that is sufficiently large to provide mechanical stability as the support, and having a cavity 104 therein. The cavity 104 of each support frame 102 has a central longitudinal axis 106a and a regular polygon shape. In the embodiment of FIGS. 1A and 1B, the cavity 104 has a square shape, while in the embodiment of FIGS. 1C and 1D, the cavity 104 has an octagonal shape. The cavity shapes are defined by sides shown having length b. For the miniaturized accelerometers of the preferred embodiments, the value of b is chosen such that the overall area of the cavity 104 is about 1 to 2 $mm^2$ or less.

Figure 1D:
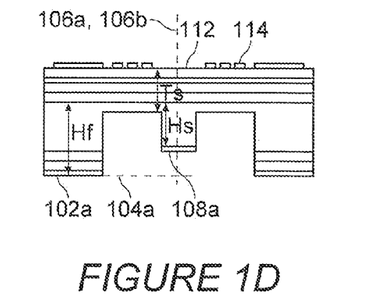

The accelerometer 100 also includes a seismic mass 108 in the cavity 104, having a central longitudinal axis 106b. As illustrated in FIGS. 1B and 1D, the central longitudinal axes 106a and 106b of the cavity 104 and the seismic mass 108 are co-incident. A cylindrical seismic mass 108 having a circular cross-section with a radius $R_s$ (the value of $R_s$ may be varied depending on the desired resonance frequency and sensitivity) is shown in the first embodiment of FIGS. 1A and 1B, and an octagonal-prism seismic mass 108 having a span S and side length a (the values of S and a may also be varied depending on the desired resonance frequency and sensitivity) is shown in the second embodiment of FIGS. 1C and 1D.

The arrangement of the seismic mass 108 is such that the accelerometer 100 has a symmetric structure. In the embodiments illustrated, the seismic mass 108 is at the centre of the cavity 104. The seismic mass 108 is also designed such that the bottom 108a of the seismic mass 108 is above the plane of the base 102a of the support frame 102 or the base 104a of the cavity 104. This allows for ease of mounting and operation of the accelerometer 100 without having the seismic mass 108 touching or contacting the surface on which the accelerometer 100 is placed. In other words, the bottom 108a of the seismic mass 108 is spaced from the support frame base 102a or the cavity base 104a. This is shown schematically in FIGS. 1B and 1D, where the seismic mass 108 has a height $H_s$ (as measured from the plane of the lower surface of the suspension beam 110) that is less than the height $H_f$ of the support frame 102 (as measured from the plane of the lower surface of the suspension beam 110). The space between the cavity base 104a and the seismic mass bottom 108a is typically between 10 to 100 µm.

Extending from the support frame 102 to the seismic mass 108 is a plurality of silicon-based composite suspension beams 110. In the embodiment of FIGS. 1A and 1B, four suspension beams 110 are provided, while in the embodiment of FIGS. 1C and 1D, eight suspension beams 110 are provided. In both embodiments, each suspension beam 110 is substantially rectangular (length $L_s$ and width $B_s$, both of which may be varied depending on the desired resonance frequency and sensitivity), has a thickness $T_s$ (in the range 1 to 50 µm) and extends orthogonally or perpendicularly from a centre of the sides that make up the polygon shape of the cavity 104. Details of the structure of the suspension beams 110 will be described later with reference to FIG. 2.

Each of the suspension beams 110 has a piezoelectric thin film 112 coated on a top surface thereof. The piezoelectric thin films 112 have an electric polarization that is approximately aligned with a plane of the top surface of the suspension beams 110. In the preferred form, the piezoelectric thin films 112 are ferroelectric thin films with a thickness of not less than 1.2 µm.

On the upper surface of each piezoelectric thin film 112, a pair of inter-digital electrodes 114 is deposited. The inter-digital electrodes 114 are depicted in FIGS. 1B and 1D but have been omitted from FIGS. 1A and 1C for clarity. Also omitted from the figures is the routing and connection of at least one terminal of each of the inter-digital electrodes 114 to a top surface of the seismic mass 108. This will be described in detail later with reference to FIGS. 3A and 3B.

Figure 2:
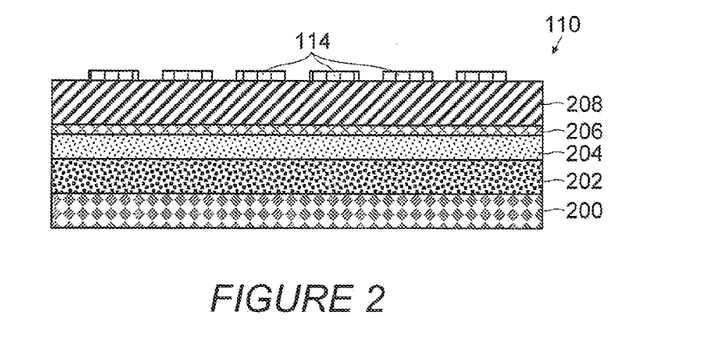
FIG. 2 is a schematic cross-sectional view of a suspension beam.

Referring now to FIG. 2, a cross-section of the composite suspension beams 110 is shown. The stack of layers making up the suspension beam 110 include thin layers of Si 200, $SiO_2$ 202, $SiN_x$ 204, YSZ (Yttria Stabilized Zirconia) 206, PLZT $((Pb,La)(Zr,Ti)O_3)$ piezoelectric thin films 208, and Ti/Au inter-digital electrodes 114.

With the above arrangement of the accelerometer, acceleration in a direction substantially perpendicular to the suspension beams 110 can be measured. In particular, the presence of such acceleration would excite bending and hence strain in the piezoelectric thin films 208, which would in turn cause electrical signals to be generated over two terminals of the inter-digital electrodes 114. These electrical signals can then be measured to sense the acceleration.

Figure 3A:
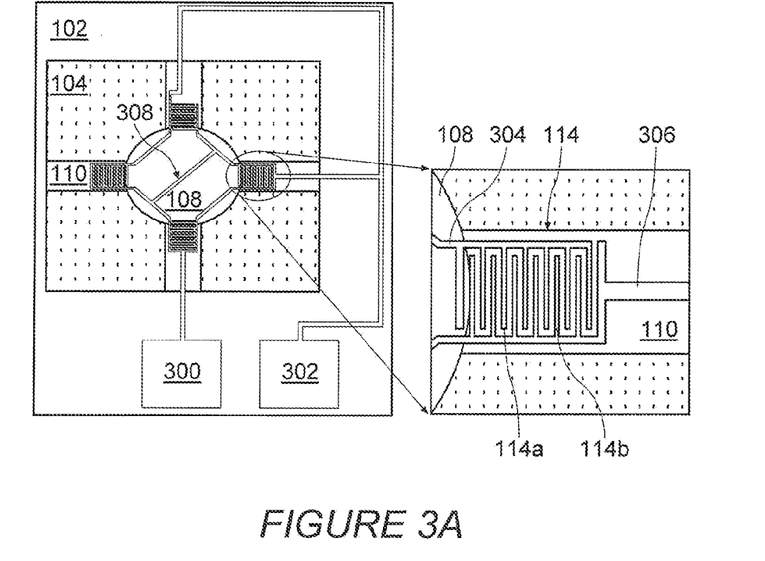
FIG. 3A is a schematic plan view of one embodiment of the accelerometer having inter-digital electrodes located adjacent the seismic mass.
Figure 3B:
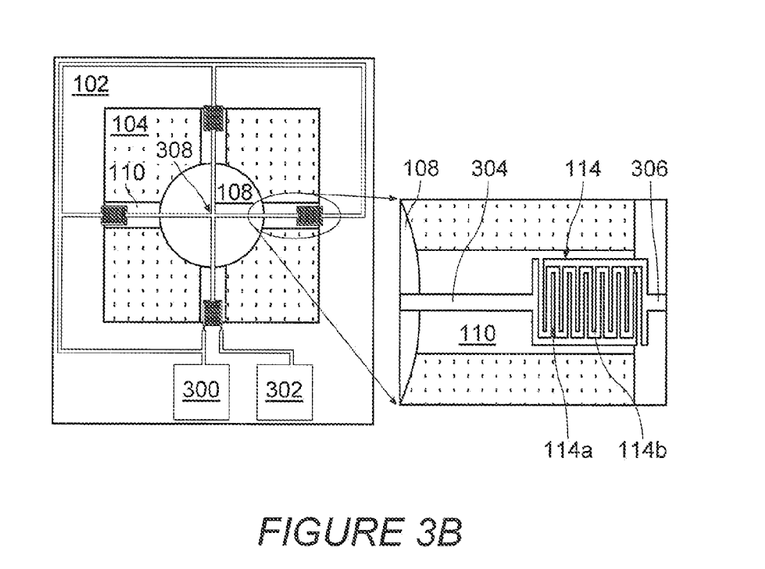
FIG. 3B is a schematic plan view of another embodiment of the accelerometer having inter-digital electrodes located adjacent the support frame.

In order to achieve a constructive piezoelectric output, the inter-digital electrodes 114 are placed in appropriate regions to pick up piezoelectric charge with the same sign generated by either compressive or tensile strain. In the example accelerometers of FIGS. 1A to 1D, the inter-digital electrodes 114 are disposed in the regions either adjacent the seismic mass 108 or adjacent the support frame 102 corresponding to either compressive or tensile strain under acceleration. These locations are illustrated in FIGS. 3A and 3B respectively, and in particular in the right-hand-side image of those figures which show a closer view of the location of the inter-digital electrodes 114. Also clearly illustrated in the closer view of FIGS. 3A and 3B are the interdigitated fingers of each electrode 114a, 114b of the pair of inter-digital electrodes 114. In the preferred form, the gap between the inter-digital fingers is 3 to 10 µm while the width of each electrode finger is 5 to 10 µm. The electrodes 114a, 114b respectively connect to a bonding pad 300, 302 via terminals 304, 306 respectively.

In order to collect constructively the piezoelectric outputs from the inter-digital electrodes 114 of each suspension beam 110, at least some of the inter-digital electrodes 114 are electrically connected in parallel. This is realized by a special electrode connection in which one terminal 304 of the two terminals 304, 306 of the inter-digital electrodes 114 is routed to and connected at a top surface of the seismic mass 108. In the preferred embodiments shown in FIGS. 3A and 3B, the connection is at a central point 308 (i.e. at the central longitudinal axis) of the seismic mass 108. With such a connection, the electrical signals collected by the finger pairs of the inter-digital electrodes can constructively contribute to the electrical output of the accelerometer. In FIG. 3A and FIG. 3B, two different routes are drawn through the seismic mass 108 to realize the electrical connection in parallel between two adjacent pairs of inter-digital electrodes 114. It will be appreciated that, although FIGS. 3A and 3B both show the connection as applied to an accelerometer having a circular-shaped seismic mass having four suspension beams, a similar connection can be implemented for other seismic mass and suspension beam arrangements (e.g. an octagonal-shaped seismic mass having eight suspension beams).

Figure 4:
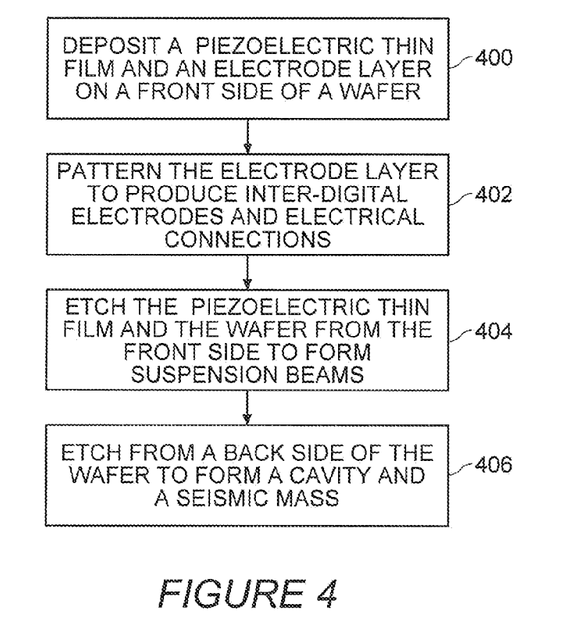
FIG. 4 is a flowchart of the accelerometer fabrication method.

The fabrication of the miniaturized accelerometers by way of micro-machining or micro-fabrication will now be described with reference to FIG. 4. The method is carried out on a wafer to mass produce the miniaturized accelerometers. In step 400, a piezoelectric thin film and an electrode layer are deposited on a front side of the wafer. In step 402, the electrode layer is patterned to produce inter-digital electrodes and electrical connections for the inter-digital electrodes. As described with reference to FIGS. 3A and 3B, at least one terminal of the inter-digital electrodes is routed to and electrically connected at a top surface of the seismic mass. Where the electrodes and electrical connections are formed before the seismic mass fabrication, the routing and connection will be with respect to the part of the wafer that will eventually form the seismic mass of the accelerometer. In step 404, the piezoelectric thin film and the wafer are etched from the front side to form the suspension beams of the accelerometer, and in step 406, the back side of the wafer is etched to form the cavity of the support frame and the seismic mass. In the above method, four masks are used. Two masks are used for patterning the suspension beam structure and inter-digital electrodes respectively during the processing from the front side of the wafer, and the other two masks are used for defining the suspension beams and the seismic mass respectively during the processing from the back side of the wafer. In this method, therefore, the support frame, the suspension beams and the seismic mass are made of a monolithic substrate material (e.g. single crystal silicon wafer).

Figure 5:
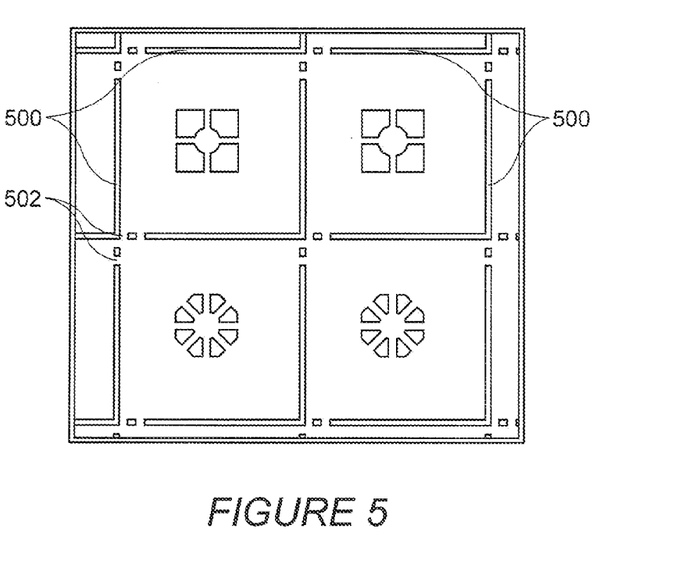
FIG. 5 is a schematic plan view of a mask with dicing line patterns having connections at the corners for easy separation after micro-fabrication.

The result of the above process is a plurality of miniaturized accelerometers formed on the wafer. For example, in one experiment using a wafer having a four-inch diameter, 192 accelerometers were formed after the wafer-based micro-fabrication process was completed. The next step in the process is the separation of individual accelerometers from the wafer. This is typically done by a dicing process. To reduce damage to the free standing suspension beams during the dicing process, the method makes use of dicing lines. Referring to the mask illustrated in FIG. 5, a dicing line pattern is shown schematically relative to the pattern for etching the cavity and suspension beams of the accelerometers. Lines 500 of the pattern are arranged such that, after a wafer is etched using the mask, each accelerometer on the wafer will be attached to the adjacent accelerometer only near corners of its support frame, with dicing lines separating them at other locations. Thus, after the final micro-fabrication step, individual accelerometers can be separated by applying a small force without having to resort to conventional dicing processes.

The method of forming the dicing lines includes forming trenches at the front side of the wafer (i.e. during the front side etching process) around individual accelerometers with a depth corresponding to the desired thickness of the suspension beams, except at certain fixed locations defined by mask portions 502. The fixed locations will ultimately form the sole attachment points or joints between adjacent accelerometers. Corresponding trenches are then formed at the back side of the wafer (i.e. during the back side etching process) until the trenches at the front side and the back side are connected, leaving individual accelerometers joined to each other only at the fixed locations. As will be appreciated from FIG. 5, the fixed locations will be at or adjacent each corner of the support frame of the accelerometers. The individual accelerometers so formed can therefore be separated by applying a small force at the corners.

The method of the invention may be used for both normal silicon wafers and silicon-on-insulator (SOI) wafers. The detailed fabrication process for each wafer type is described below.

Example 1

Micro-Fabrication Process with Silicon Wafer

A double-side polished (DSP) silicon wafer with (100) orientation was used as a base material. $SiO_2$ and $SiN_x$ layers were formed on both surfaces of the silicon wafer by thermal oxidation and low pressure chemical vapor deposition (LPCVD) methods, respectively. A yittrium-stabilized zirconia (YSZ) layer was then formed on the $SiN_x$ layer on the front side by a sol-gel method. An active piezoelectric sensor material, lead lanthanum zirconium titanate (PLZT) ferroelectric thin film with a thickness of 1.2 μm was prepared by a chemical solution method through a multiple spin-coating process on the YSZ layer. The sample was annealed at 700° C. to form a prevoskite crystalline structure. Inter-digital Au/Ti electrodes were subsequently formed on the PLZT thin film using a lift-off process.

To define the suspension beam structure and the dicing lines, all the PLZT, YSZ, $SiO_2$ and $SiN_x$ layers were etched from the front side with the aid of photolithography patterning. The PLZT and YSZ layers were etched by reactive ion etching (RIE) using $CHF_3$ and Ar mixture of gases. For $SiN_x$ etching, a gas mixture of $CHF_3$ and $O_2$ was used. This was followed by $SiO_2$ layer etching using the gas mixture of $CHF_3$ and Ar.

After etching the $SiO_2$ layer, the exposed surface is silicon. The silicon substrate was etched from the top side using Bosch's process of deep reactive ion etching (DRIE), with $SF_6$ as the etching gas and $C_4F_8$ as the passivation gas. The etching depth is about equivalent to the desired thickness for the suspension beams.

After the front side processing, a photolithography process was repeated for patterning at the back side of the wafer. First, a window was opened in the $SiN_x$ and $SiO_2$ layers for determining the height of the seismic mass body and making it 'elevated' as shown in FIGS. 1B and 1D (i.e. so the bottom of the seismic mass is spaced from the base of the cavity). On the basis of the desired height of the seismic mass, the thickness of the silicon to be etched from the backside was determined. Bosch's DRIE process was used to etch the silicon to form a trench at the back side with a depth of about 52 μm. Then Bosch's DRIE process was used after another photolithographic patterning to etch the bulk silicon away from the back side of the wafer to form the extruded seismic mass as well as to form the free standing suspension beams.

Individual die (i.e. the individual accelerometers) were subsequently separated by applying a small force near the corners. Au wires were wire bonded to the bonding pads for the electrical connection. Before piezoelectric accelerometer testing, a DC electric field was first applied to the electrodes for electric poling of the ferroelectric PLZT thin film.

Figure 6A:
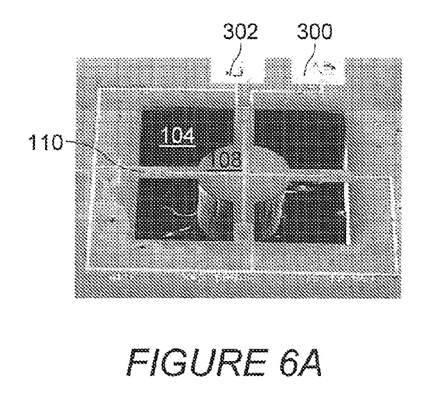
FIG. 6A is a scanning electron microscopic (SEM) image showing the top view of an accelerometer with a cylindrical seismic mass.
Figure 6B:
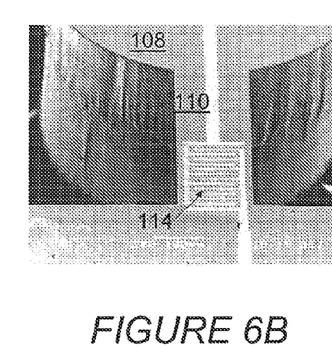
FIG. 6B is a SEM image of one of the suspension beams of FIG. 6A showing the inter-digital electrodes.
Figure 6C:
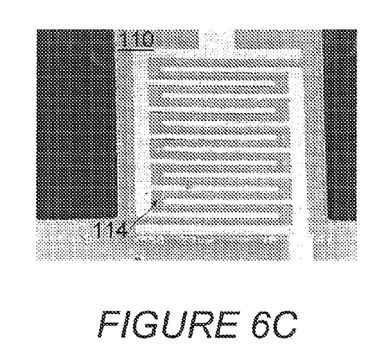
FIG. 6C is a SEM image of the inter-digital electrodes of FIG. 6B.
Figure 6D:
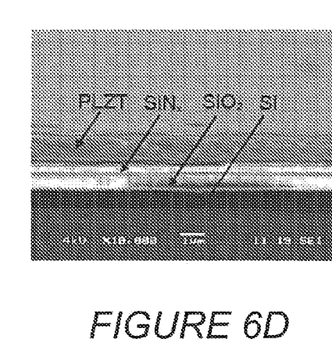
FIG. 6D is a SEM image of a cross-section of a suspension beam.

Scanning electron microscopic (SEM) images of an accelerometer obtained from the above example are shown in FIGS. 6A to 6D. As outlined earlier, FIG. 6A shows a top view of the accelerometer, FIG. 6B shows one of the suspension beams 110 with the inter-digital electrodes 114, FIG. 6C shows a pair of inter-digital electrodes 114, and FIG. 6D shows the cross-sectional view of a suspension beam 110, showing the stack of layers forming the suspension beam 110.

Example 2

Micro-Fabrication Process with SOI Wafer

An SOI wafer is a better wafer option where precise control over the thickness of the suspension beams is desired. In this example, all the thin film deposition processes were similar to those as the normal silicon wafer as described in Example 1. To define the suspension beam structure and the dicing lines, all the PLZT, YSZ, $SiO_2$ and $SiN_x$ thin film layers on the front side of the SOI wafer, and the thin Si and insulation $SiO_2$ layers of the SOI wafer, were etched from the front side with the aid of photolithography patterning. For the SOI wafer, the thickness of the Si and $SiO_2$ layers was the desired thickness for the suspension beams, which was about 15 μm in the example (i.e. the thickness of the suspension beams is determined by the thickness of the thin Si layer and the $SiO_2$ layer).

After the front side processing, a photolithography process was conducted for the patterning at the back side of the wafer. First, a window was opened in the $SiN_x$ and $SiO_2$ layers for determining the height of the seismic mass body and making it 'elevated' as shown in FIGS. 1B and 1D. On the basis of the desired height of the seismic mass, the thickness of the silicon to be etched from the back side was determined. Bosch's DRIE process was used to etch the silicon to form a trench at the back side with a depth of about 52 μm. Then Bosch's DRIE process was used after another photolithographic patterning to etch the bulk silicon away from the back side of the SOI wafer to form the extruded seismic mass as well as to form the free standing suspension beams structure. The $SiO_2$ layer functioned as an etching stop layer during the etching of the bulk Si from the backside due to the significantly different etching rates. The exposed $SiO_2$ layer in the suspension beams could optionally be removed subsequently. Individual die were then separated by applying a small force near the corners. Au wires were wire bonded to the bonding pads for the electrical connection. Before piezoelectric accelerometer testing, a DC electric field was first applied to the electrodes for the electric poling of the PLZT thin films.

Figure 7:
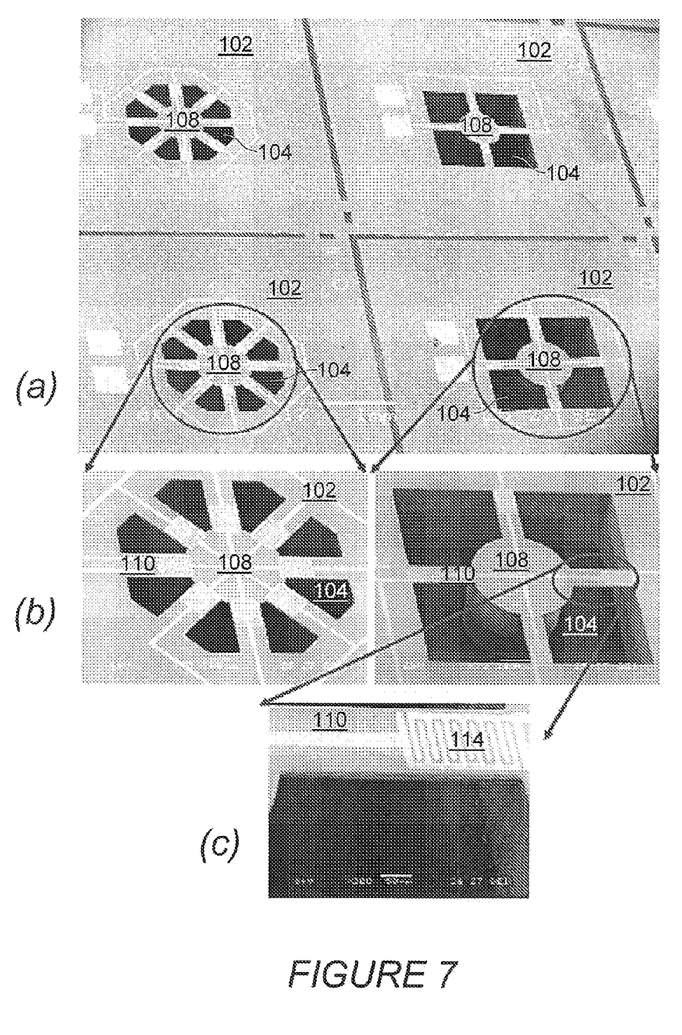
FIG. 7 is a series of SEM images of accelerometers at different magnifications.

SEM images of the accelerometers fabricated using the SOI wafer are shown in FIG. 7. Part (a) of FIG. 7 shows a top view of four accelerometers (two having octagonal-shaped seismic mass 108 and cavity 104, two others having a circular-shaped seismic mass 108 in a square cavity 104). Part (b) of FIG. 7 shows a magnification of the circled areas of part (a). Part (c) of FIG. 7 is a magnification of the circled area of part (b).

Measurement Results

Numerical simulations were carried out using ANSYS Version 10.0 and the analyses on the stress and strain of the accelerometer structures were conducted. The mechanical analyses and numerical simulations indicated the following:

(i) the accelerometer structures typically have very broad range resonance frequencies, up to 50 kHz;

(ii) the strain of the suspension beams varies from compressive to tensile from one end to another along the longitudinal direction with the dividing line at about the center. The maximum strain exists in the regions near the joints of the beams with the seismic mass and with the support frame. In the longitudinal direction, the strain magnitude gradually decreases towards the centre of the suspension beams and becomes zero at the dividing line which is close to the centre of the suspension beam. This helped to identify the regions where the inter-digital electrodes can be placed to pick up constructively the piezoelectric outputs developed under an external acceleration input, and (iii) large stress is located at the joints of the suspension beams with the support frame and the seismic mass. Keeping the suspension beams perpendicular to the joined sides of the support frames and the seismic mass can therefore reduce the local stress concentration at the joints.

Figure 8:
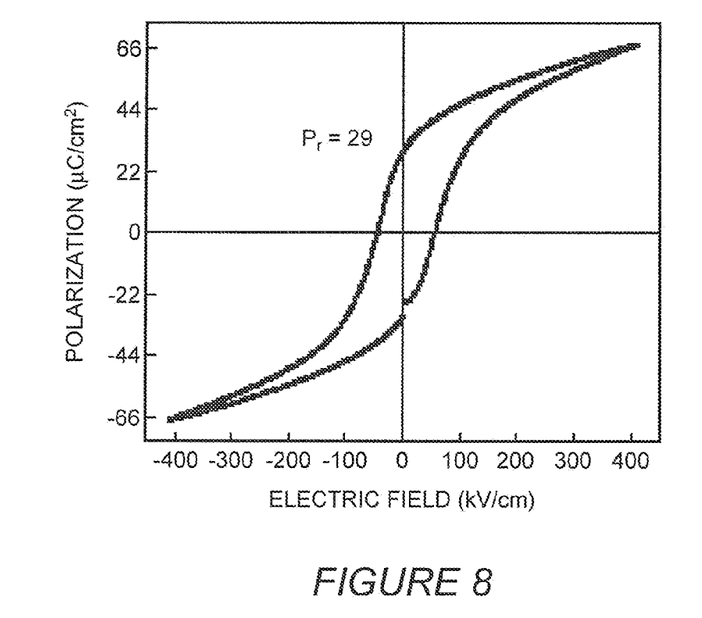
FIG. 8 is a graph showing the ferroelectric hysteresis loop of the PLZT film in an accelerometer with an applied alternating current (AC) field of 410 kV/cm applied through the inter-digital electrodes.

After the micro-fabrication was completed, the electrical polarization of the ferroelectric PLZT films was measured with the inter-digital electrodes in the plane of the surface to evaluate their quality and performance. A hysteresis loop (of the ferroelectric PLZT film) with the polarization versus the applied electric field at room temperature is shown in FIG. 8. The hysteresis loop was obtained by applying an alternating current (AC) field of 410 kV/cm through the inter-digital electrodes. As can be seen from FIG. 8, a large remnant electric polarization of about 29 $\mu C/cm^2$ was observed, which indicated that the good quality of the PLZT film was not affected by the micro-fabrication process.

Figure 9:
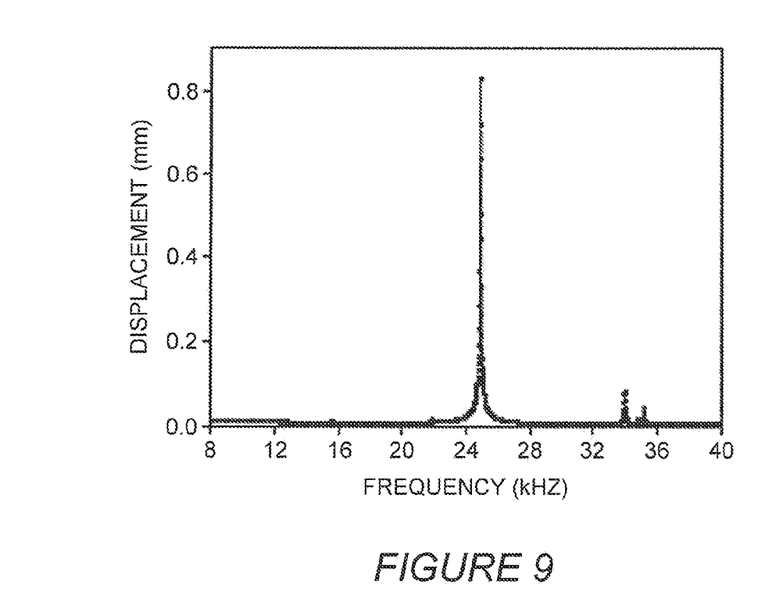
FIG. 9 is a graph showing the displacement spectrum of an accelerometer measured with a laser scanning vibrometer.
Figure 10:
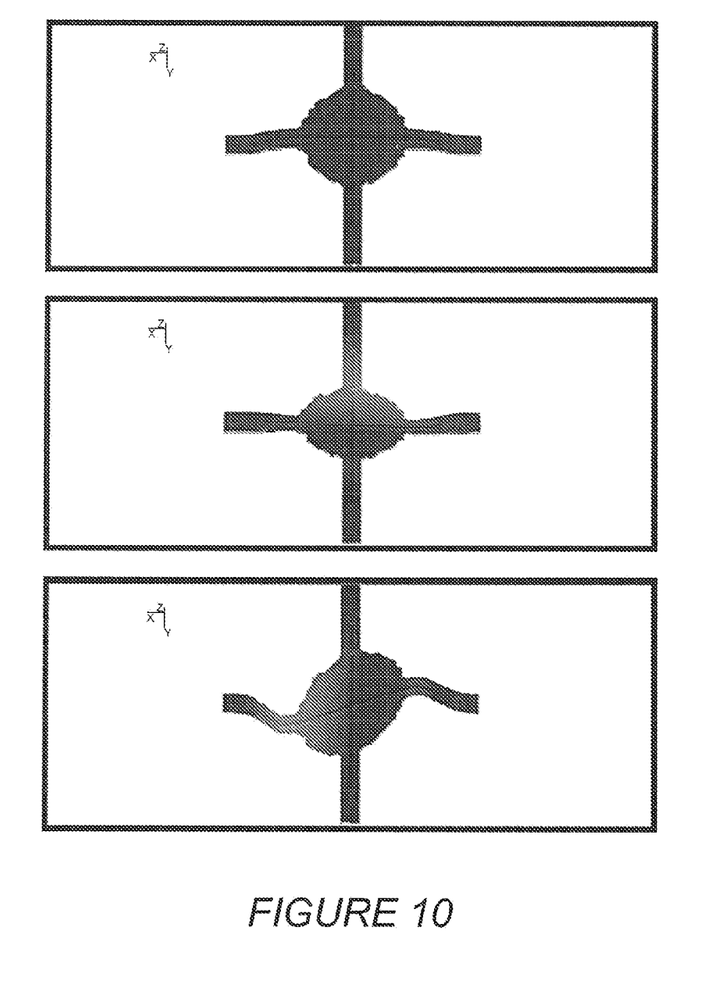
FIG. 10 is a series of three images of resonance modal analyses for one embodiment of the accelerometer.

FIG. 9 shows the displacement spectrum of an example miniaturized accelerometer measured with a laser scanning vibrometer. Three resonance peaks were identified. The resonance modal analyses, as shown in FIG. 10, further indicated that the first resonance peak at 24.9 kHz corresponds to the out-of-plane mode, the second resonance peak at 34.0 kHz corresponds to the twist mode with respect to Y axis, and the 3rd resonance at 35.2 kHz corresponds to another twist mode with respect to X axis.

The foregoing describes preferred embodiments, which, as will be understood by those skilled in the art, may be subject to variations or modifications in design, construction or operation without departing from the scope of the claims. For example, the seismic mass is not limited to circular or octagonal shapes and can include any regular polygon shape, preferably with polygon sides that are parallel with the polygon sides of the cavity. Also, depending on the seismic mass or the intended application, the number and placement of the suspension beams may also be altered. It will be appreciated that the performance characteristics of the miniaturized accelerometers will depend on, amongst others, the dimensions of the elements of the accelerometer, the selected materials used and the designed structure of the accelerometer. Given the various embodiments disclosed, variations to these aspects of the accelerometer to suit specific applications can be easily implemented and are therefore intended to be covered by the scope of the claims.

What is claimed is:

1. A miniaturized piezoelectric accelerometer comprising:
   a support frame having a cavity therein, the cavity having a central longitudinal axis,
   a seismic mass in the cavity and having a central longitudinal axis, the central longitudinal axis of the cavity and the central longitudinal axis of the seismic mass being co-incident,
   a plurality of suspension beams extending from the support frame to the seismic mass, each of the suspension beams having a piezoelectric thin film coated on a top surface thereof,
   a pair of inter-digital electrodes deposited on an upper surface of each piezoelectric thin film, and
   at least one terminal of each of the inter-digital electrodes being routed to and electrically connected at a top surface of the seismic mass.

2. The miniaturized piezoelectric accelerometer of claim 1, wherein the cavity has a base and the seismic mass has a bottom, the bottom being spaced from the base.

3. The miniaturized piezoelectric accelerometer of claim 1, wherein the piezoelectric thin film has an electric polarization that is approximately aligned with a plane of the top surface of the suspension beams.

4. The miniaturized piezoelectric accelerometer of claim 1, wherein the electrical connection of the at least one terminal of each of the inter-digital electrodes is at the central longitudinal axis of the seismic mass.

5. The miniaturized piezoelectric accelerometer of claim 1, wherein the pairs of inter-digital electrodes are electrically connected in parallel.

6. The miniaturized piezoelectric accelerometer of claim 1, wherein the inter-digital electrodes are disposed at a location selected from the group consisting of: adjacent the seismic mass and adjacent the support frame.

7. The miniaturized piezoelectric accelerometer of claim 1, wherein the cavity of the support frame has a regular polygon shape.

8. The miniaturized piezoelectric accelerometer of claim 7, wherein the regular polygon shape is defined by polygon sides, and wherein each of the plurality of suspension beams extends orthogonally from a centre of each polygon side.

9. The miniaturized piezoelectric accelerometer of claim 8, wherein each of the plurality of suspension beams is substantially rectangular.

10. The miniaturized piezoelectric accelerometer of claim 7, wherein the regular polygon shape is a square, and wherein the plurality of suspension beams comprises four suspension beams.

11. The miniaturized piezoelectric accelerometer of claim 7, wherein the regular polygon shape is octagon, and wherein the plurality of suspension beams comprises eight suspension beams.

12. The miniaturized piezoelectric accelerometer of claim 1, wherein the seismic mass is cylindrical.

13. The miniaturized piezoelectric accelerometer of claim 7, wherein the seismic mass has a regular polygon shape with polygon sides that are parallel with polygon sides of the cavity.

14. The miniaturized piezoelectric accelerometer of claim 1, wherein the support frame, the plurality of suspension beams and the seismic mass are made of a monolithic substrate material.

15. The miniaturized piezoelectric accelerometer of claim 1, wherein each of the plurality of suspension beams comprises multiple layers, including Si, $SiO_2$, $SiN_x$, YSZ, and ferroelectric PLZT.

16. A method of fabricating miniaturized piezoelectric accelerometers comprising:
   depositing a piezoelectric thin film and an electrode layer on a front side of a wafer,
   patterning the electrode layer to produce inter-digital electrodes and electrical connections for the inter-digital electrodes, with at least one terminal of the inter-digital electrodes being routed to and electrically connected at a top surface of a part of the wafer that defines or that will define a seismic mass of the accelerometer,
   etching the piezoelectric thin film and the wafer from the front side to form a plurality of suspension beams extending from a support frame of the accelerometer, and
   etching from a back side of the wafer to form a cavity of the support frame and the seismic mass.

17. The method of claim 16, wherein the wafer is a single crystal silicon wafer and wherein the etching from the back side of the wafer is carried out o space a bottom of the seismic mass from a base of the cavity.

18. The method of claim 16, wherein the wafer is an SOI wafer comprising a thin Si layer, a $SiO_2$ layer, and a bulk Si layer, with the thickness of the suspension beams being determined by the thickness of the thin Si layer and the $SiO_2$ layer.

19. The method of claim 16, further comprising etching to form dicing lines comprising:
   forming trenches at the front side of the wafer around individual accelerometers with a depth corresponding to the desired thickness of the suspension beams, except at fixed locations, and
   forming corresponding trenches at the back side of the wafer until the trenches at the front side and the back side are connected, leaving the individual accelerometers joined to each other only at the fixed locations.

20. The method of claim 19, further comprising separating the individual accelerometers by applying a small force near the fixed locations, the fixed locations being near corners of the support frame of each accelerometer.

* * * * *